United States Patent
Pan et al.

(10) Patent No.: US 11,475,876 B2
(45) Date of Patent: Oct. 18, 2022

(54) SEMANTIC RECOGNITION METHOD AND SEMANTIC RECOGNITION DEVICE

(71) Applicant: ALi Corporation, Hsinchu (TW)

(72) Inventors: Jou-Yun Pan, Hsinchu (TW); Keng-Chih Chen, Hsinchu (TW)

(73) Assignee: ALi Corporation, Hsinchu (TW)

(*) Notice: Subject to any disclaimer, the term of this patent is extended or adjusted under 35 U.S.C. 154(b) by 91 days.

(21) Appl. No.: 17/103,968

(22) Filed: Nov. 25, 2020

(65) Prior Publication Data

US 2021/0343272 A1 Nov. 4, 2021

(30) Foreign Application Priority Data

Apr. 29, 2020 (CN) .......................... 202010355431.5

(51) Int. Cl.
 *G10L 15/02* (2006.01)
 *G10L 21/06* (2013.01)
 *G10L 15/16* (2006.01)
 *G10L 15/05* (2013.01)

(52) U.S. Cl.
 CPC ............. *G10L 15/02* (2013.01); *G10L 15/05* (2013.01); *G10L 15/16* (2013.01); *G10L 21/06* (2013.01)

(58) Field of Classification Search
 CPC ......... G10L 15/02; G10L 15/05; G10L 15/16; G10L 21/06
 USPC ........................................................ 704/270
 See application file for complete search history.

(56) References Cited

U.S. PATENT DOCUMENTS

| | | | | |
|---|---|---|---|---|
| 7,676,372 | B1* | 3/2010 | Oba ................... | G10L 21/0364 704/271 |
| 9,697,822 | B1* | 7/2017 | Naik ................... | G10L 15/22 |
| 10,199,051 | B2* | 2/2019 | Binder ................ | G06F 3/167 |
| 10,262,062 | B2* | 4/2019 | Chang ................ | G06F 16/3329 |
| 10,460,215 | B2* | 10/2019 | Herold ............... | G10L 15/1815 |
| 10,474,962 | B2* | 11/2019 | Hakkani-Tur ....... | G06N 20/00 |
| 10,559,308 | B2* | 2/2020 | Smythe .............. | G06N 20/00 |
| 10,705,892 | B2* | 7/2020 | Riva .................. | G06N 3/0427 |
| 10,748,529 | B1* | 8/2020 | Milden ............... | G06F 3/167 |
| 10,978,090 | B2* | 4/2021 | Binder ................ | G10L 15/22 |
| 11,100,384 | B2* | 8/2021 | Finkelstein ......... | G06N 5/04 |
| 11,182,432 | B2* | 11/2021 | Shi .................... | G06F 16/90332 |
| 11,222,627 | B1* | 1/2022 | Qian .................. | G10L 15/1815 |

FOREIGN PATENT DOCUMENTS

| | | |
|---|---|---|
| CN | 101794120 | 8/2010 |
| CN | 106652999 | 5/2017 |
| CN | 107229684 | 10/2017 |

* cited by examiner

Primary Examiner — Susan I McFadden
(74) Attorney, Agent, or Firm — JCIPRNET

(57) ABSTRACT

A semantic recognition method and a semantic recognition device are provided. A spectrogram of a speech signal is generated. At least one keyword of the spectrogram is detected by inputting the spectrogram into a neural network model. A semantic category to which each of the at least one keyword belongs is distinguished. A semantic intention of the speech signal is determined according to the at least one keyword and the semantic category of the at least one keyword.

13 Claims, 5 Drawing Sheets

SEMANTIC RECOGNITION METHOD AND SEMANTIC RECOGNITION DEVICE

CROSS-REFERENCE TO RELATED APPLICATION

This application claims the priority benefit of China patent application serial no. 202010355431.5, filed on Apr. 29, 2020. The entirety of the above-mentioned patent application is hereby incorporated by reference herein and made a part of this specification.

BACKGROUND

Technical Field

The invention relates to a speech recognition technique, and particularly relates to a semantic recognition method applying a neural network model and a semantic recognition device.

Description of Related Art

Along with advancement of technology, more and more electronic devices begin to use speech control, and speech control will become a common user interface for most electronic devices in the future. Therefore, a recognition rate of speech recognition will directly affect user experience of a user using the electronic device. In an application field of speech control, when a speech instruction is limited to a fixed speech length and an order of words of the speech instruction is fixed, a computing resource required for speech recognition is relatively less, but it is extremely not user-friendly and has a higher error rate in use. For example, when a user speaks a speech instruction in a different order of words or a speech instruction with redundant words or there is interference from surrounding noise, the error rate is increased significantly. For example, when the speech instruction is designed as "turn on the TV" but the user says a phrase of "TV turn on", a situation that the speech instruction cannot be recognized occurs.

On the other hand, a natural language understanding (NLU) technique is currently an important key technique. The NLU technique may be applied to extract key information in a phrase of a user, and judge an intention of the user to perform subsequent processing corresponding to the intention of the user. Therefore, when the NLU technique that may perform word segmentation and word rearrangement is applied, a speech length and an order of words of the speech instruction may be not fixed, so that users may send the speech instructions according to their own way of speaking. However, in an actual application, the computing resource required by the NLU technique is quite large, and the NLU technique is not easy to be implemented in an embedded system. For example, in a situation of applying the NLU technique to implement speech recognition, an acoustic database and a language database with a huge amount of data are both necessary, so that computation processing is generally implemented by a cloud computing platform.

SUMMARY

Therefore, the invention is directed to a semantic recognition method and a semantic recognition device, which increase flexibility of semantic recognition without using a cloud computing resource.

An embodiment of the invention provides a semantic recognition method, which includes following steps. A spectrogram of a speech signal is generated. At least one keyword of the spectrogram is detected by inputting the spectrogram into a neural network model. A semantic category to which each of the at least one keyword belongs is distinguished. A semantic intention of the speech signal is determined according to the at least one keyword and the semantic category of the at least one keyword.

An embodiment of the invention provides a semantic recognition device including a storage device and a processing circuit. The processing circuit is coupled to the storage device, and is configured to execute instructions in the storage device to execute following steps. A spectrogram of a speech signal is generated. At least one keyword of the spectrogram is detected by inputting the spectrogram into a neural network model. A semantic category to which each of the at least one keyword belongs is distinguished. A semantic intention of the speech signal is determined according to the at least one keyword and the semantic category of the at least one keyword.

Based on the above description, in the embodiment of the invention, the trained neural network model detects target features from the spectrogram of the speech signal. By detecting target feature blocks corresponding to the keywords from the spectrogram of the speech signal, the keywords are recognized from the speech signal. Therefore, the semantic intention of the speech signal may be recognized based on the respective semantic category of one or more keywords. In this way, flexibility of semantic recognition is increased under a condition of significantly saving computing resources, thereby improving convenience and an application scope of speech control.

To make the aforementioned more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
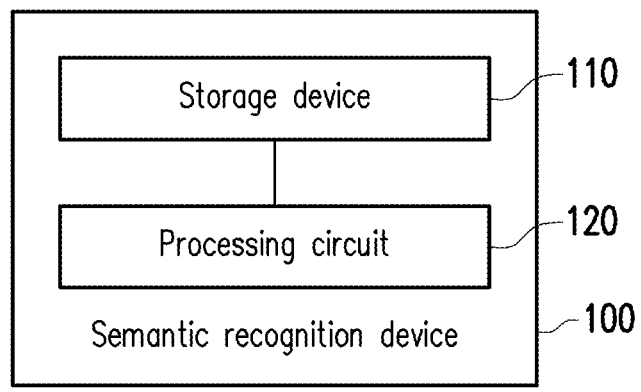
FIG. 1 is a schematic diagram of a semantic recognition device according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

A semantic recognition device and a semantic recognition method disclosed below may be implemented by a combination of hardware and software. FIG. 1 is a schematic diagram of a semantic recognition device according to an embodiment of the invention. Referring to FIG. 1, a semantic recognition device 100 includes a storage device 110 and a processing circuit 120. In an embodiment, the semantic recognition device 100 may be implemented as an audio processing chip with a voice recognition function.

The storage device 110 is configured to store data such as program codes, firmware/software modules, etc., which may be any type of a fixed or removable random access memory (RAM), a read-only memory (ROM), a flash memory, a hard disk or other similar devices, an integrated circuit, and combinations thereof. In an embodiment, the storage device 110 may record a neural network model and model parameters thereof.

The processing circuit 120 is coupled to the storage device 110, which is, for example, a central processing unit (CPU), or other programmable general-purpose or special-purpose microprocessor, a digital signal processor (DSP), a programmable controller, an application specific integrated circuit (ASIC), a programmable logic device (PLD), or other similar devices or a combination of the above devices. In an embodiment, the processing circuit 120 may execute the program codes, firmware/software modules, instructions, etc., recorded in the storage device 110 to implement a semantic recognition method of an embodiment of the invention.

Figure 2:
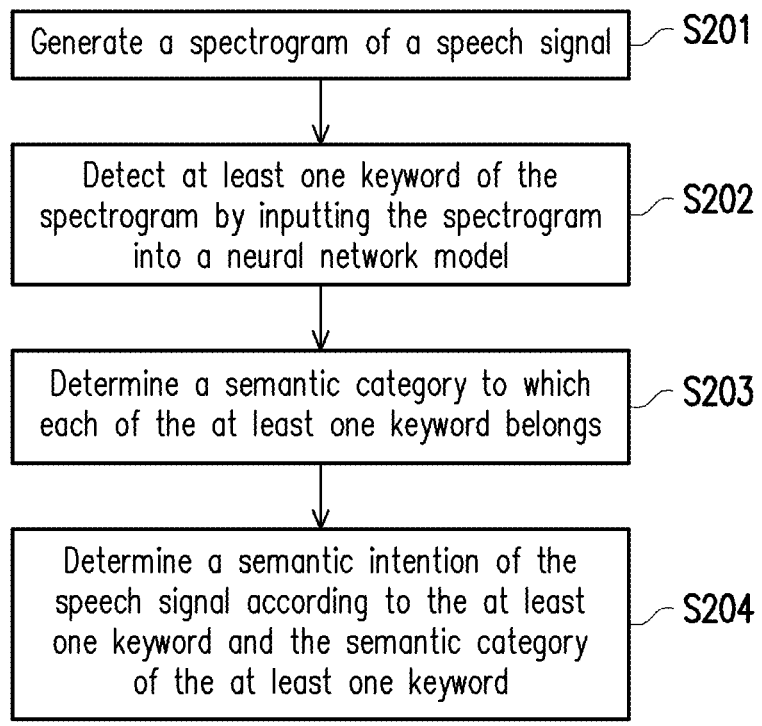
FIG. 2 is flowchart illustrating a semantic recognition method according to an embodiment of the invention.

FIG. 2 is flowchart illustrating a semantic recognition method according to an embodiment of the invention. Referring to FIG. 1 and FIG. 2, the semantic recognition method of the embodiment is adapted to the semantic recognition device 100 of FIG. 1, and a detailed flow of the semantic recognition method is described below with reference of various components in the semantic recognition device 100.

In step S201, the processing circuit 120 generates a spectrogram of a speech signal. The speech signal spoken by the user is received through a sound pickup device (such as a microphone), and the processing circuit 120 may acquire the speech signal. Then, the processing circuit 120 may perform a series of voice processing on the analog time-domain speech signal to generate a corresponding spectrogram. The spectrogram is used to represent speech spectrum characteristics of the speech signal varied along with time. A horizontal axis of the spectrogram represents time, and a vertical axis of the spectrogram represents frequency. A color shade of each feature point on the spectrogram is used to represent an energy intensity of a specific frequency band. In other words, the spectrogram includes time information, frequency information and intensity information of the speech signal. A plenty of useful information in the speech signal may be revealed through the spectrogram, such as a volume, a center frequency, a frequency distribution range and a speech length, etc.

In an embodiment, the processing circuit 120 may use fast Fourier transformation (FFT) to convert the speech signal into the spectrogram. Alternatively, in an embodiment, the processing circuit 120 may use the fast Fourier transformation and Mel-filtering to convert the speech signal into the spectrogram.

Figure 3:
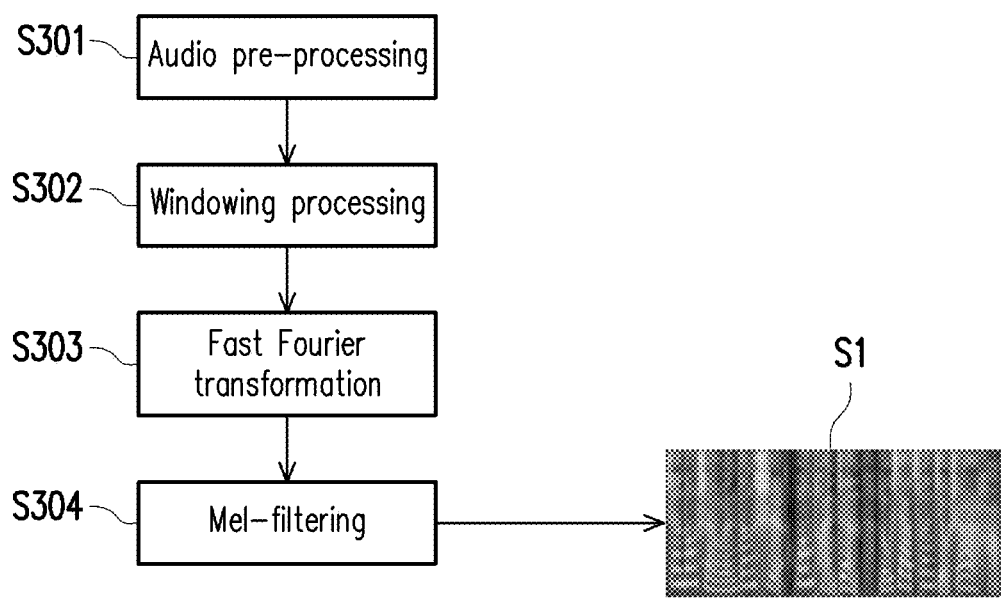
FIG. 3 is a flowchart of generating a spectrogram according to an embodiment of the invention.

In detail, FIG. 3 is a flowchart of generating a spectrogram according to an embodiment of the invention. Referring to FIG. 3, in step S301, the processing circuit 120 performs audio pre-processing on the speech signal. The processing circuit 120 may first sample the analog time-domain speech signal to obtain a sampled speech signal, and a sampling frequency is, for example, 8K Hz or 16K Hz, etc., which is not limited by the invention. Then, the processing circuit 120 may perform pre-emphasis processing and frame blocking processing. In detail, the processing circuit 120 may use a high-pass filter to perform the pre-emphasis processing. Then, the processing circuit 120 may group N sampled data into one frame to perform the frame blocking processing.

In a step S302, the processing circuit 120 performs windowing processing. For example, the processing circuit 120 may perform the windowing processing by multiplying each frame by a Hamming window. In step S303, the processing circuit 120 performs fast Fourier transformation. To be specific, the processing circuit 120 may perform time-frequency transform processing on time-domain data within a sampling period (i.e., a frame) through the fast Fourier transformation to obtain frequency spectrum information associated with one frame. The frequency spectrum information includes frequency spectrum coefficients corresponding to different frequencies.

In an embodiment, in step S304, the processing circuit 120 further performs Mel-filtering to generate a spectrogram S1. To be specific, the processing circuit 120 may input the frequency spectrum information generated by the fast Fourier transformation into a plurality of nonlinearly distributed triangular bandpass filters for filtering to obtain a Mel-frequency cepstral coefficient (MFCC). The MFCC simulates auditory characteristics of human ears, which may reflect human's perception characteristics for speech, so as to achieve a higher recognition rate. Then, the processing circuit 120 may combine the MFCCs of a plurality of frames corresponding to different times to obtain the spectrogram S1. As shown in FIG. 3, a horizontal axis of the spectrogram S1 represents time (unit: second), a vertical axis of the spectrogram S1 represents frequency (unit: kilohertz (kHz)), and a color shade of each feature point on the spectrogram S1 is used to indicate an energy intensity of a specific frequency band. However, a time length of the spectrogram is not limited by the invention, which may be set according to actual needs.

It should be noted that in an embodiment, the processing circuit 120 may directly generate the spectrogram according to the frequency spectrum information generated by the fast Fourier transformation, and combine the frequency spectrum information of each frame corresponding to a different time to obtain the spectrogram. Therefore, implementation of the step S304 is optional.

Referring back to the flow of FIG. 2, after obtaining the spectrogram of the speech signal, in step S202, the processing circuit 120 detects at least one keyword of the spectrogram by inputting the spectrogram into a neural network model. Here, the spectrogram of the speech signal may include P*Q feature points (P and Q are positive integers), and the spectrogram may be regarded as a piece of image data input into the neural network model. The processing circuit 120 may use the neural network model to determine whether the spectrogram includes target feature blocks corresponding to the keywords. The processing circuit 120 inputs the spectrogram into the neural network model to detect at least one target feature block corresponding to the at least one keyword from the spectrogram.

The trained neural network model is constructed in advance through deep learning based on a training data set, which may be stored in the storage device 110. In other words, model parameters of the trained neural network model (such as a number of neural network layers and a weight of each of the neural network layers, etc.) have been determined by pre-training and stored in the storage device 110. To be specific, when the spectrogram is input into the neural network model, feature extraction is first performed to generate feature vectors. Then, the feature vectors are input into a classifier in the neural network model, and the classifier classifies the feature vectors to detect the target feature blocks corresponding to the keywords in the spectrogram. The neural network model may include a convolution neural network (CNN) model or a neural network model applying an attention mechanism. For example, the neural network model may be R-CNN, Fast R-CNN, Faster R-CNN, YOLO or SSD, etc., used for target feature detection in the CNN model, but the invention is not limited thereto.

Figure 4:
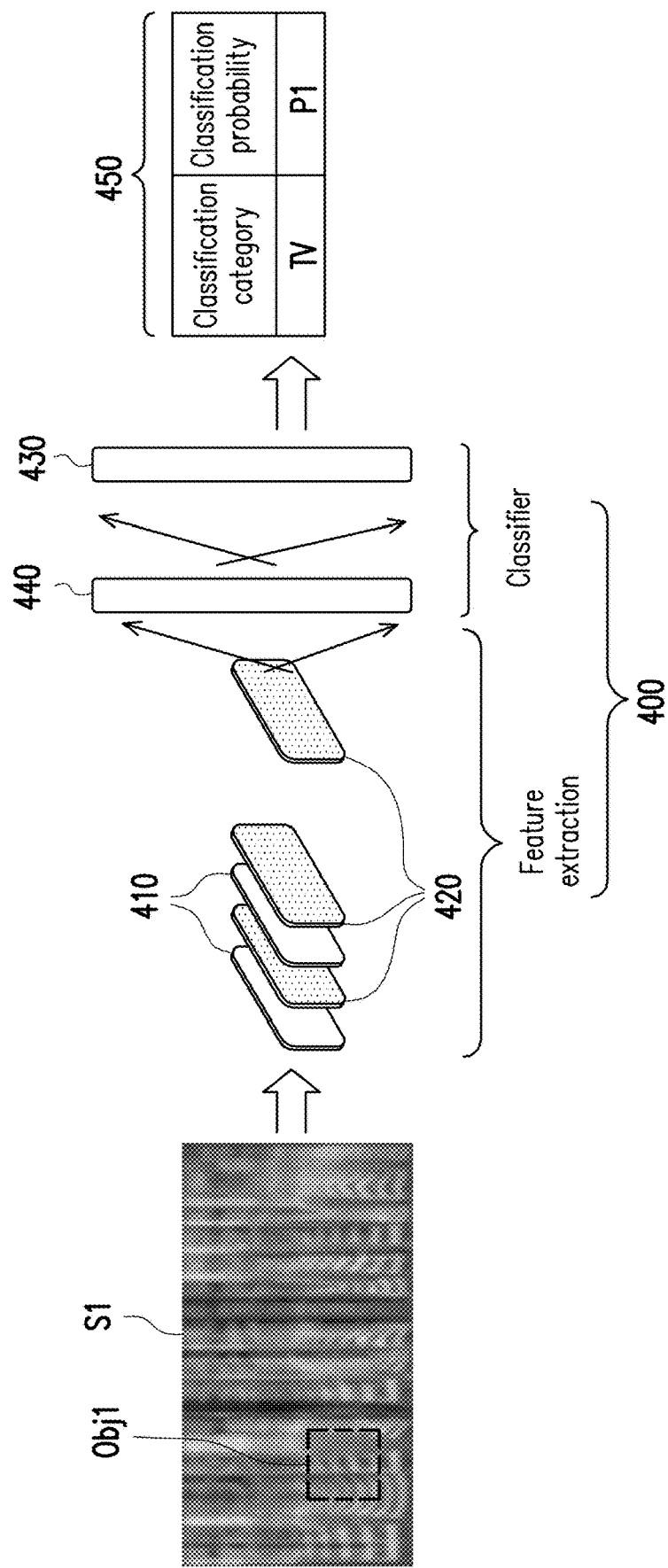
FIG. 4 is a schematic diagram of detecting keywords according to a convolution neural network model according to an embodiment of the invention.

FIG. 4 is a schematic diagram of detecting keywords according to the CNN model according to an embodiment of the invention. Referring to FIG. 4, a situation that the spectrogram S1 is input into the CNN model is taken as an example for description. In this example, a CNN 400 is composed of at least one convolution layer 410, at least one pooling layer 420, at least one fully connected layer 430 and an output layer 440.

A front stage of the CNN 400 is usually composed of the convolution layers 410 and the pooling layers 420 connected in series to obtain a feature value of the spectrogram S1. The feature value may be a multi-dimensional array, which is generally regarded as a feature vector of the input spectrogram S1. A rear stage of the CNN 400 includes the fully connected layer 430 and the output layer 440, and the fully connected layer 430 and the output layer 440 classify objects (i.e., the target feature blocks) in the spectrogram S1 according to the feature value generated through the convolution layers 410 and the pooling layers 420, and obtain object classification information 450. The object classification information 450 may include a classification category and a classification probability. In the example of FIG. 4, the processing circuit 120 may detect a target feature block Obj1 classified as "TV" from the spectrogram S1 through the CNN 400. The target feature block Obj1 corresponds to a classification probability P1. Thus, the processing circuit 120 may determine that a keyword "TV" is detected from the spectrogram S1. However, the number and types of the keywords are not limited by the invention, which may be set according to actual needs.

Moreover, in an embodiment, the processing circuit 120 may detect the keywords in the spectrogram through a neural network model using an attention mechanism. For example, the method of using the convolution neural network model to generate feature vectors is replaced by a connection layer that implements the attention mechanism to construct a neural network model applying the attention mechanism.

On the other hand, in order to construct a neural network model that may detect keywords from a spectrogram, the training data set used to train the neural network model includes a plurality of sample spectrograms. These sample spectrograms are generated by one or more person speaking the known keywords. In a model training stage, blocks corresponding to the known keywords in these sample spectrograms have been framed and given answer information (i.e., the corresponding known keywords). These sample spectrograms are input into the neural network model one by one, and a detection result generated by the neural network model according to the sample spectrogram is compared with the answer information to calculate an error. Thereafter, a weight of each network layer in the network is adjusted through the error and in a way of backward transmission. A method of calculating the error (i.e., a loss function) is, for example, square difference or Softmax, etc.

Figure 5:
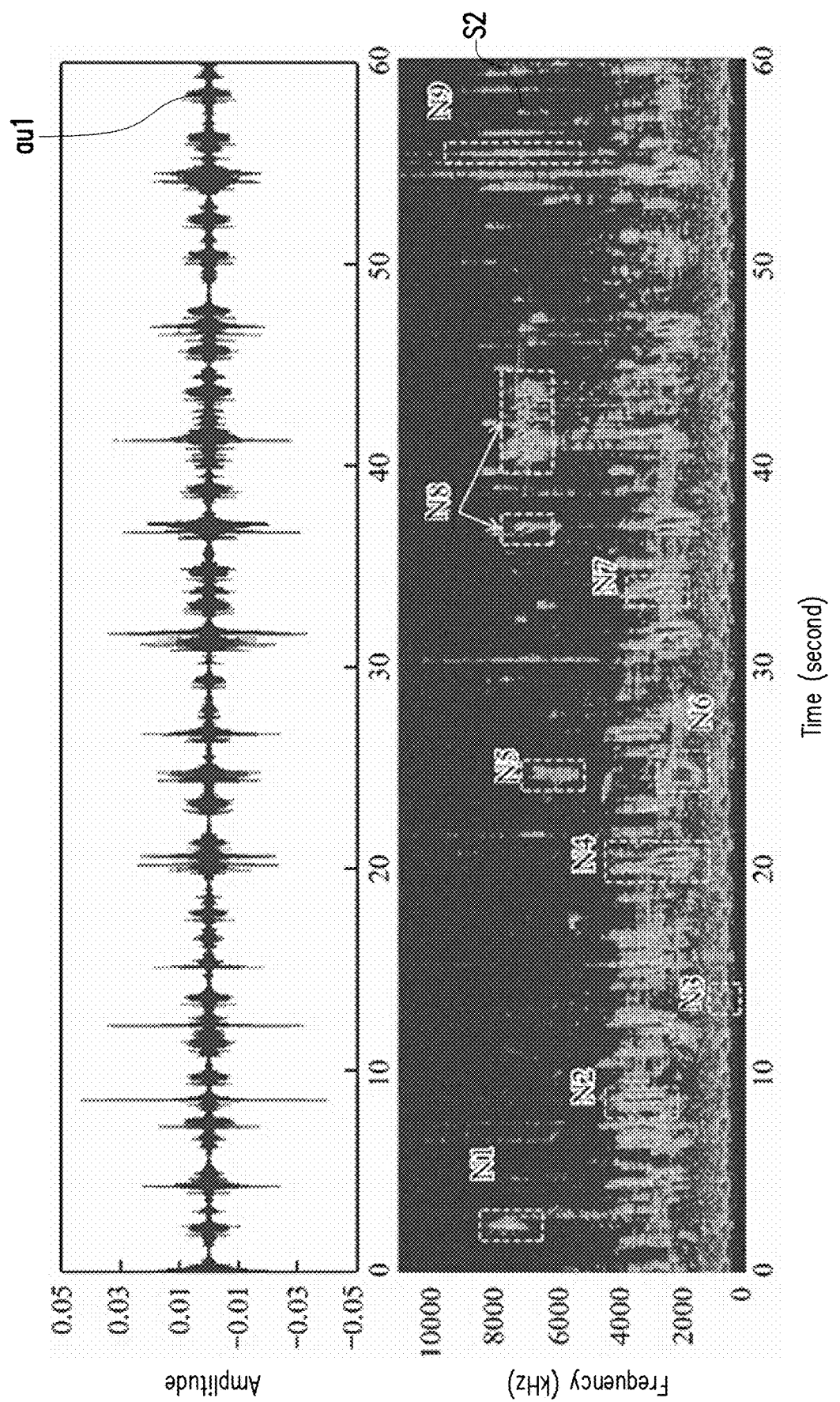
FIG. 5 is a schematic diagram of a spectrogram and target feature blocks according to an embodiment of the invention.

FIG. 5 is a schematic diagram of a spectrogram and target feature blocks according to an embodiment of the invention. Referring to FIG. 5, the processing circuit 120 may acquire a speech signal au1 lasting for one minute, and generate a spectrogram s2 of the speech signal au1. Then, the processing circuit 120 may detect a plurality of target feature blocks N1-N9 from the spectrogram s2 according to the trained neural network model. The target feature blocks N1-N9 may be respectively classified as corresponding to a keyword, and have a corresponding classification probability. Thereafter, the processing circuit 120 may determine a semantic intention according to the keywords respectively corresponding to the target feature blocks N1-N9. In other words, in the embodiment of the invention, the keywords included in the speech signal may be recognized by inputting the spectrogram of the speech signal into the neural network model, and then the semantic intention may be further determined according to the keywords.

Referring back to the flow of FIG. 2, after detecting the at least one keyword from the spectrogram, in step S203, the processing circuit 120 distinguishes a semantic category to which each of the at least one keyword belongs. Here, the processing circuit 120 may distinguish the semantic category of each keyword in the spectrogram by inquiring a keyword list in the storage device 110, where the keyword list records a plurality of keywords and their corresponding semantic categories. The number and types of the semantic categories mentioned above may be designed according to actual applications, and are not limited by the invention. A following table 1 is an example of a keyword list, but the invention is not limited thereto.

TABLE 1

| Referential No. | Semantic category | Keyword |
| --- | --- | --- |
| 1 | Action | Turn on, turn off, . . . |
| 2 | Object | TV, electric fan, air conditioner, electric lamp, . . . |
| 3 | Scene | Room, living room, bathroom, . . . |

In step S204, the processing circuit 120 determines a semantic intention of the speech signal according to the at least one keyword and the semantic category of the at least one keyword. In an embodiment, the processing circuit 120 may perform semantic slot filling to determine the semantic intention of the speech signal. The processing circuit 120 fills the at least one keyword into at least one semantic slot of a semantic frame according to the semantic category of the at least one keyword. To be specific, in an embodiment, a plurality of the semantic slots of the semantic frame also respectively correspond to semantic slot categories. When the semantic category of the keyword is the same as the semantic slot category of the semantic slot, the processing circuit 120 may fill the keyword into the corresponding semantic slot. In response to all of the at least one semantic slot being filled, the processing circuit 120 may determine the semantic intention based on the at least one keyword filled in the at least one semantic slot.

Figure 6:
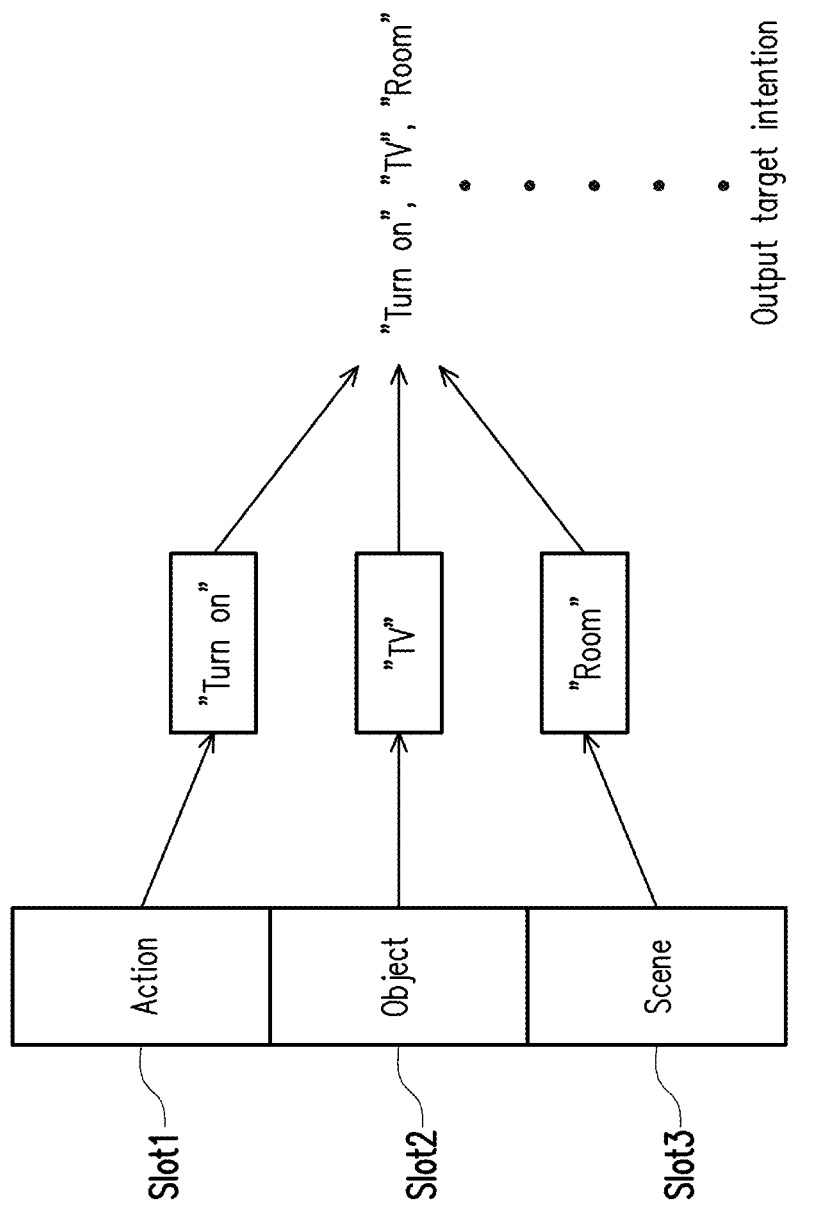
FIG. 6 is a schematic diagram of recognizing a semantic intention according to an embodiment of the invention.

For example, FIG. 6 is a schematic diagram of recognizing a semantic intention according to an embodiment of the invention. Referring to FIG. 6, in this example, three semantic slots Slot1-Slot3 respectively correspond to semantic slot categories "action", "object", and "scene". It is assumed that the processing circuit 120 may detect three keywords "turn on", "TV", and "room" from the spectrogram, the processing circuit 120 may fill in the keyword "turn on" into the semantic slot Slot1 corresponding to the semantic slot category "action"; fill the keyword "TV" into the semantic slot Slot2 corresponding to the semantic slot category "object"; and fill the keyword "room" into the semantic slot Slot3 corresponding to the semantic slot category "scene". In response to all of the three semantic slots Slot1-Slot3 being filled, the processing circuit 120 may output the semantic intention. Therefore, in an embodiment, even if an order of the keywords spoken by the user is different, the processing circuit 120 may still recognize the same semantic intention. For example, regardless of whether the user says "the TV in the room turn on" or "turn on the TV in the room", the processing circuit 120 may output the same semantic intention after executing the steps S201 to S204.

It should be noted that in an embodiment, when the semantic category of a first keyword in the at least one keyword is the same as the semantic category of a second keyword in the at least one keyword, the processing circuit 120 selects to fill the first keyword with a first classification probability into the at least one semantic slot of the semantic frame. Where, the first classification probability of the first keyword and a second classification probability of the second keyword are generated by the neural network model, and the first classification probability is greater than the second classification probability. In detail, the processing circuit 120 may detect one or more keywords (i.e., the first keyword and the second keyword) corresponding to the same semantic category from the spectrogram. When semantic slot filling is performed, there will be a situation that the semantic category of multiple keywords is the same as the semantic slot category of the semantic slot, but the processing circuit 120 selects one of the keywords (i.e., the first keyword) having a higher classification probability for filling into the corresponding semantic slot. For example, the processing circuit 120 may detect the keywords "room" and "living room" from the spectrogram at the same time by using neural network model, and the keyword "room" corresponds to a classification probability of 0.8, and the keyword "living room" corresponds to a classification probability of 0.5. In this case, the processing circuit 120 may select to fill the keyword "living room" with the higher classification probability into the semantic slot, and discard the keyword "living room" with the lower classification probability.

In summary, in the embodiments of the invention, without the need for a huge acoustic database, language database, and complex operations, the neural network model may be used to detect the target feature blocks corresponding to the keywords in the spectrogram, which is suitable for being implemented in embedded systems. A target feature detection result of the neural network model may be used to distinguish whether the speech signal spoken by the user includes the keywords, so that the semantic intention of the user may be determined according to the keywords. Therefore, even if the word order in the speech instruction is changed, the semantic intention of the user may still be recognized, which greatly improves flexibility of semantic recognition, thereby improving practicability, convenience and application scope of speech control.

It will be apparent to those skilled in the art that various modifications and variations can be made to the disclosed embodiments without departing from the scope or spirit of the invention. In view of the foregoing, it is intended that the invention covers modifications and variations provided they fall within the scope of the following claims and their equivalents.

What is claimed is:

1. A semantic recognition method, comprising:
   generating a spectrogram of a speech signal;
   detecting at least one keyword of the spectrogram by inputting the spectrogram into a neural network model to detect at least one target feature block corresponding to the at least one keyword from the spectrogram, wherein the target feature block comprises part of feature points of the spectrogram, the neural network model output a classification category of the at least one target feature block within the spectrogram, and the at least one keyword is the classification category;
   distinguishing a semantic category to which each of the at least one keyword belongs; and
   determining a semantic intention of the speech signal according to the at least one keyword and the semantic category of the at least one keyword.

2. The semantic recognition method as claimed in claim 1, wherein the step of generating the spectrogram of the speech signal comprises:
   using fast Fourier transformation to convert the speech signal into the spectrogram, wherein the spectrogram comprises time information, frequency information, and intensity information of the speech signal.

3. The semantic recognition method as claimed in claim 1, wherein the step of generating the spectrogram of the speech signal comprises:
   using fast Fourier transformation and Mel-filtering to convert the speech signal into the spectrogram, wherein the spectrogram comprises time information, frequency information, and intensity information of the speech signal.

4. The semantic recognition method as claimed in claim 1, wherein the neural network model comprises a convolution neural network model or a neural network model applying an attention mechanism.

5. The semantic recognition method as claimed in claim 1, wherein the step of determining the semantic intention of the speech signal according to the at least one keyword and the semantic category of the at least one keyword comprises:
   filling the at least one keyword into at least one semantic slot of a semantic frame according to the semantic category of the at least one keyword; and
   determining the semantic intention according to the at least one keyword filled in the at least one semantic slot in response to all of the at least one semantic slot being filled.

6. The semantic recognition method as claimed in claim 5, wherein the step of filling the at least one keyword into the at least one semantic slot of the semantic frame according to the semantic category of the at least one keyword comprises:
   selecting to fill a first keyword having a first classification probability into the at least one semantic slot of the semantic frame when the semantic category of the first keyword in the at least one keyword is the same as the semantic category of a second keyword in the at least one keyword, wherein the first classification probability of the first keyword and a second classification probability of the second keyword are generated by the neural network model, and the first classification probability is greater than the second classification probability.

7. A semantic recognition method, comprising:
   generating a spectrogram of a speech signal;

detecting at least one keyword of the spectrogram by inputting the spectrogram into a neural network model to detect at least one target feature block corresponding to the at least one keyword from the spectrogram, wherein the target feature block comprises part of feature points of the spectrogram, the neural network model is built up based on a relationship between each first keyword of the at least one keyword and the part of feature points of the spectrogram in the target feature block corresponding to the first keyword;

distinguishing a semantic category to which each of the at least one keyword belongs; and determining a semantic intention of the speech signal according to the at least one keyword and the semantic category of the at least one keyword.

8. A semantic recognition device, comprising:

a storage device; and a processing circuit, coupled to the storage device and configured to execute instructions in the storage device to:

generate a spectrogram of a speech signal;

detect at least one keyword of the spectrogram by inputting the spectrogram into a neural network model to detect at least one target feature block corresponding to the at least one keyword from the spectrogram, wherein the target feature block comprises part of feature points of the spectrogram, the neural network model output a classification category of the at least one target feature block within the spectrogram, and the at least one keyword is the classification category;

distinguish a semantic category to which each of the at least one keyword belongs; and determine a semantic intention of the speech signal according to the at least one keyword and the semantic category of the at least one keyword.

9. The semantic recognition device as claimed in claim 8, wherein the processing circuit is configured to:

use fast Fourier transformation to convert the speech signal into the spectrogram, wherein the spectrogram comprises time information, frequency information, and intensity information of the speech signal.

10. The semantic recognition device as claimed in claim 8, wherein the processing circuit is configured to:

use fast Fourier transformation and Mel-filtering to convert the speech signal into the spectrogram, wherein the spectrogram comprises time information, frequency information, and intensity information of the speech signal.

11. The semantic recognition device as claimed in claim 8, wherein the neural network model comprises a convolution neural network model or a neural network model applying an attention mechanism.

12. The semantic recognition device as claimed in claim 8, wherein the processing circuit is configured to:

fill the at least one keyword into at least one semantic slot of a semantic fame according to the semantic category of the at least one keyword; and determine the semantic intention according to the at least one keyword filled in the at least one semantic slot in response to all of the at least one semantic slot being filled.

13. The semantic recognition device as claimed in claim 12, wherein the processing circuit is configured to:

select to fill a first keyword having a first classification probability into the at least one semantic slot of the semantic frame when the semantic category of the first keyword in the at least one keyword is the same as the semantic category of a second keyword in the at least one keyword, wherein the first classification probability of the first keyword and a second classification probability of the second keyword are generated by the neural network model, and the first classification probability is greater than the second classification probability.

* * * * *